UNITED STATES PATENT OFFICE.

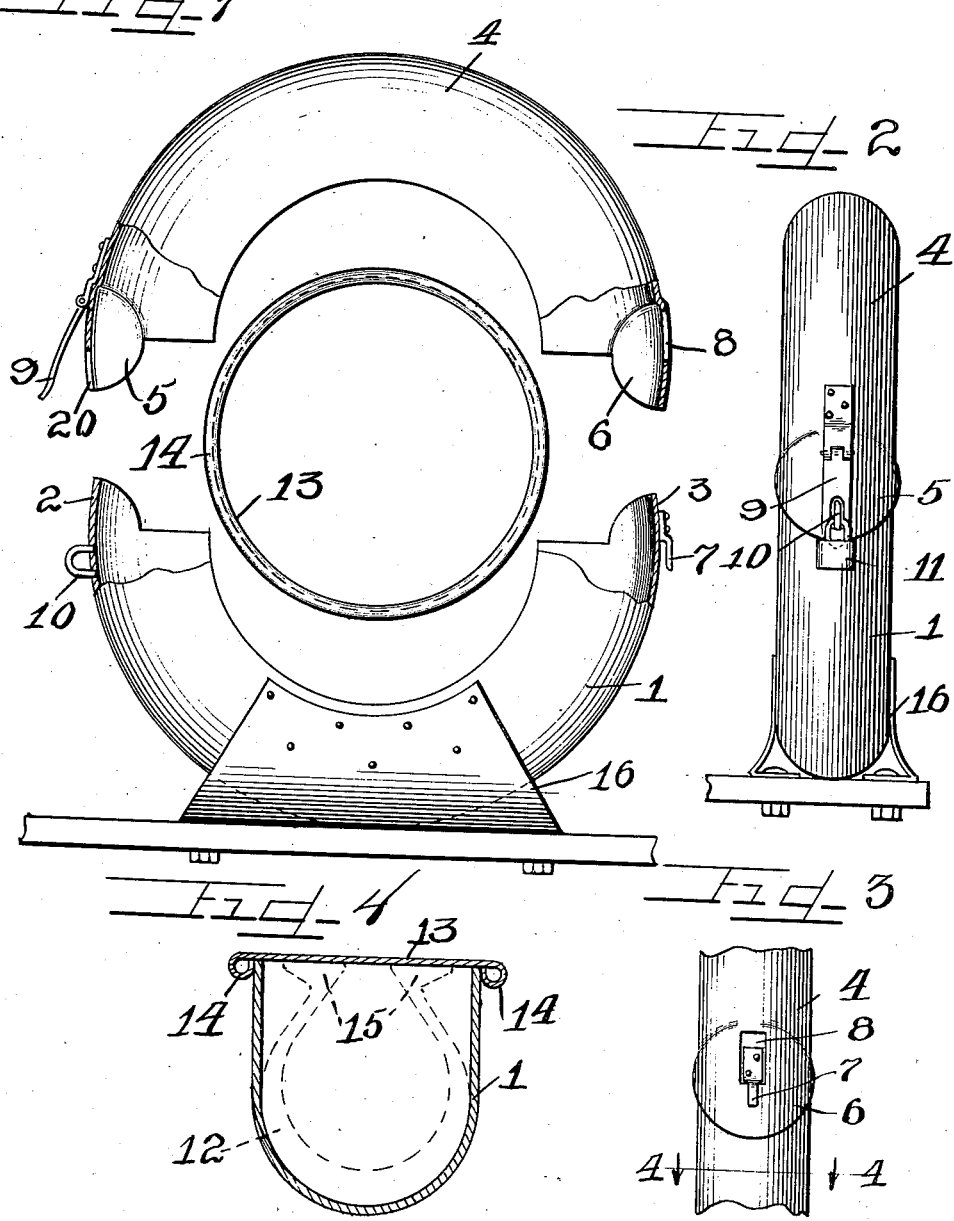

WALTER R. GREEN, OF CHICAGO, ILLINOIS.

PROTECTIVE CASING FOR TIRES.

1,068,892.   Specification of Letters Patent.   Patented July 29, 1913.

Application filed July 5, 1912. Serial No. 707,670.

*To all whom it may concern:*

Be it known that I, WALTER R. GREEN, a citizen of the United States, and a resident of the city of Chicago, in the county of Cook and State of Illinois, have invented certain new and useful Improvements in Protective Casings for Tires; and I do hereby declare that the following is a full, clear, and exact description of the same, reference being had to the accompanying drawings, and to the numbers of reference marked thereon, which form a part of this specification.

With the extensive introduction into use of pneumatic tires, it has been found that the spare tires carried upon automobiles (and thereby ordinarily subjected to the weather when not in use) deteriorate, as well as warp to a considerable extent.

It is an object of this invention to provide a protective covering for such spare tires, which will prevent the warping of the tire, as well as protect the same from the elements.

It is an important object of this invention to afford a dust and weather proof tire protecting casing, adapted to contain and support a tire casing to prevent the warping or spreading of the same.

It is finally an object of this invention to provide an exceedingly strong and durable protective casing for pneumatic tires, cheap to construct and maintain, and which may be readily attached to the vehicle upon which it is to be used.

In the drawings: Figure 1 is a side elevation of the protective casing embodying my invention, showing the parts disassembled and the tire casing removed. Fig. 2 is an edge view of the device as it appears when assembled. Fig. 3 is a fragmentary view of the edge opposite that illustrated in Fig. 2. Fig. 4 is an enlarged, transverse section taken on line 4—4 of Fig. 3.

As shown in the drawings: A sheet of relatively light, thin metal is stamped or pressed to afford a semi-circular and concave base portion 1, of the casing, and provided thereon are upwardly directed lugs 2 and 3, the conformation of all of which adapts the same to fit very closely to the casing of the tire when secured in place. 4, indicates a corresponding casing adapted to be placed on the base section 1, and provided with downwardly directed lugs 5 and 6, adapted to engage over the lugs 2 and 3 respectively on said lower casing.

As shown in Fig. 1, the upper casing 4, may be firmly secured to the lower casing 1, by means of the hook 7, on the lug 3, which may be engaged in the aperture 8, in the lug 6, and the hasp 9, adapted to be engaged over the staple 10, which extends through the slot 20, and locked in place by the padlock 11, or any other suitable locking device. A circular plate 13, is provided, which is of a size adapted to fit within the space afforded between the casings 1 and 2, and is provided with peripheral beads 14, adapted to engage over the edges of said casings 1 and 4, to afford a watertight construction, as well as prevent the relative lateral movement of said casings. The tire 12, is ordinarily first slipped over the beads 14, on the circular plate 13, and is held in position in the channel afforded between said beads, by means of the clenches 15, which bear firmly against the said plate. The tire and plate 13, are then inserted in place in the lower casing section 1, in such a manner that the beads 14, engage over the edges of said section. The upper casing section 4, is then engaged in position by means of the hook 7, which is engaged in the aperture 8, and the hasp 9, which is engaged over the staple 10, and the entire device locked in position by means of a suitable locking device.

As shown in Fig. 1, the lower casing section 1, has a flanged bracket 16, rigidly secured thereto by riveting or otherwise and adapted to be secured to the running board of an automobile or to any other part thereof, and acting to support the casing, which, of course, may also be otherwise secured upon the automobile.

The operation is believed to be obvious from the foregoing description. When the tire casing is inclosed within its case, it is wholly protected from dirt and dust, and from other injurious objects to which it is otherwise likely to be exposed. The inner circular plate fits closely within the upper periphery of the tire casing, and affords a support therefor in part from the top, so that the weight of the tire casing is distributed in such a manner as to prevent the deformation of the tire when the tire is not in use.

Of course, details of the construction and application may be varied without departing from the principles of this invention, and I therefore do not purpose limiting the patent granted upon this application, otherwise than necessitated by the prior art.

I claim as my invention:

1. A device of the class described embracing an inner and outer member, said outer member comprising a plurality of interlocking sections having straight parallel sides thereon, and beads on said inner member adapted to be engaged against the sides of said outer member to afford a dust proof contact between the two members.

2. A device of the class described embracing a semi-circular and concave base section, concave lugs thereon, a hook on one of said lugs, a staple secured to said section slightly below another lug, a semi-circular and concave top section, an apertured and a slotted concave lug thereon corresponding with the lugs on the base section and adapted to fit over the same and by their engagement with said staple and hook respectively to prevent vertical as well as lateral displacement of the top section, a circular plate adapted to receive a tire thereon and distribute the weight of the same over a wide area on the lower section, and peripheral beads thereon adapted to bear against the sides of said concave sections to afford a weather proof construction.

3. A device of the class described embracing a semi-circular and concave base section, concave lugs thereon, a hook on one of said lugs, a staple secured to said section slightly below another lug, a semi-circular and concave top section, and apertured and slotted concave lugs thereon corresponding with the lugs on the base section and adapted to fit over the same and by their engagement with said staple and hook respectively to prevent vertical as well as lateral displacement of the top section.

4. A device of the class described embracing a semi-circular and concave base section, a semi-circular and concave top section, interfitting lugs on said base and top sections adapted to prevent vertical as well as lateral displacement of the top section, a circular plate adapted to receive a tire thereon and distribute the weight over a wide area on the lower section, and peripheral beads adapted to bear against the sides of said concave sections to afford a weather proof construction.

5. A device of the class described embracing a concave base section, concave lugs thereon, a hook on one of said lugs, a staple secured to said section slightly below another lug, a concave top section, lugs thereon corresponding with the lugs on the base section and adapted to fit over the same and by their engagement with said staple and hook respectively to prevent displacement of the top section, a circular plate adapted to receive a tire thereon and distribute the weight over a wide area on the lower section, and peripheral beads adapted to bear against the sides of said concave sections to seal the same from the elements, and prevent relative lateral movement of said sections.

In testimony whereof I have hereunto subscribed my name in the presence of two subscribing witnesses.

WALTER R. GREEN.

Witnesses:
CHARLES W. HILLS, Jr.,
GEORGE R. MOORE.